United States Patent [19]

Riedner et al.

[11] Patent Number: 4,783,596
[45] Date of Patent: Nov. 8, 1988

[54] SOLID STATE SCINTILLATOR AND TREATMENT THEREFOR

[75] Inventors: Robert J. Riedner, Waukesha; Erdogan O. Gürmen, Milwaukee, both of Wis.; Charles D. Greskovich; Dominic A. Cusano, both of Schenectady, N.Y.

[73] Assignee: General Electric Company, Milwaukee, Wis.

[21] Appl. No.: 59,426

[22] Filed: Jun. 8, 1987

[51] Int. Cl.$^4$ ............................................. C09K 11/78
[52] U.S. Cl. .......................... 250/483.1; 252/301.4 R; 252/301.4 F; 264/1.2; 264/21; 264/65
[58] Field of Search .................. 252/301.4 R, 301.4 F; 264/1.2, 21, 65; 250/483.1

[56] References Cited

U.S. PATENT DOCUMENTS

| | | | |
|---|---|---|---|
| 4,032,471 | 6/1977 | Luckey | 252/301.4 |
| 4,166,831 | 9/1979 | Rhodes et al. | 264/65 |
| 4,315,832 | 2/1982 | Pastor et al. | 252/301.4 |
| 4,421,671 | 10/1983 | Cusano et al. | 252/301.4 |
| 4,456,487 | 6/1984 | Pollock | 252/301.4 |
| 4,466,929 | 8/1984 | Greskovich et al. | 264/1.2 |
| 4,466,930 | 8/1984 | Greskovich et al. | 264/1.2 |
| 4,473,513 | 9/1984 | Cusano et al. | 252/301.4 |
| 4,518,545 | 5/1985 | Cusano et al. | 264/65 |
| 4,518,546 | 5/1985 | Greskovich et al. | 264/1.2 |
| 4,525,628 | 6/1985 | DiBianca et al. | 252/301.4 R |
| 4,587,035 | 5/1986 | Kokta | 252/301.4 |
| 4,733,088 | 3/1988 | Yamada et al. | 250/483.1 |

Primary Examiner—Jack Cooper
Attorney, Agent, or Firm—John F. McDevitt

[57] ABSTRACT

A polycrystalline ceramic scintillator is disclosed for radiographic applications which has received a controlled oxidation anneal to reduce radiation damage otherwise occuring when said scintillator is exposed to X radiation during conversion of said X radiation to the display image. The particular ceramic material treated in said manner comprises a densely sintered rare earth doped gadolinia containing metal oxide having a cubic crystal structure which has been annealed after sintering in a controlled oxygen containing atmosphere. A preferred ceramic composition comprises from about 5 mole percent up to about 50 mole percent $Gd_2O_3$, between about 0.5 mole percent and 12 mole percent of a rare earth activator oxide selected from the group consisting of $Eu_2O_3$ and $Nd_2O_3$, and between about 0.0001 and 0.5 mole percent of at least one afterglow reducer selected from the group consisting of $Pr_2O_3$ and $Tb_2O_3$, and the remainder of said composition being $Y_2O_3$. A treatment to produce said improved x-ray conversion medium is also disclosed along with radiographic imaging systems and methods employing said improved x-ray image conversion medium.

17 Claims, 1 Drawing Sheet

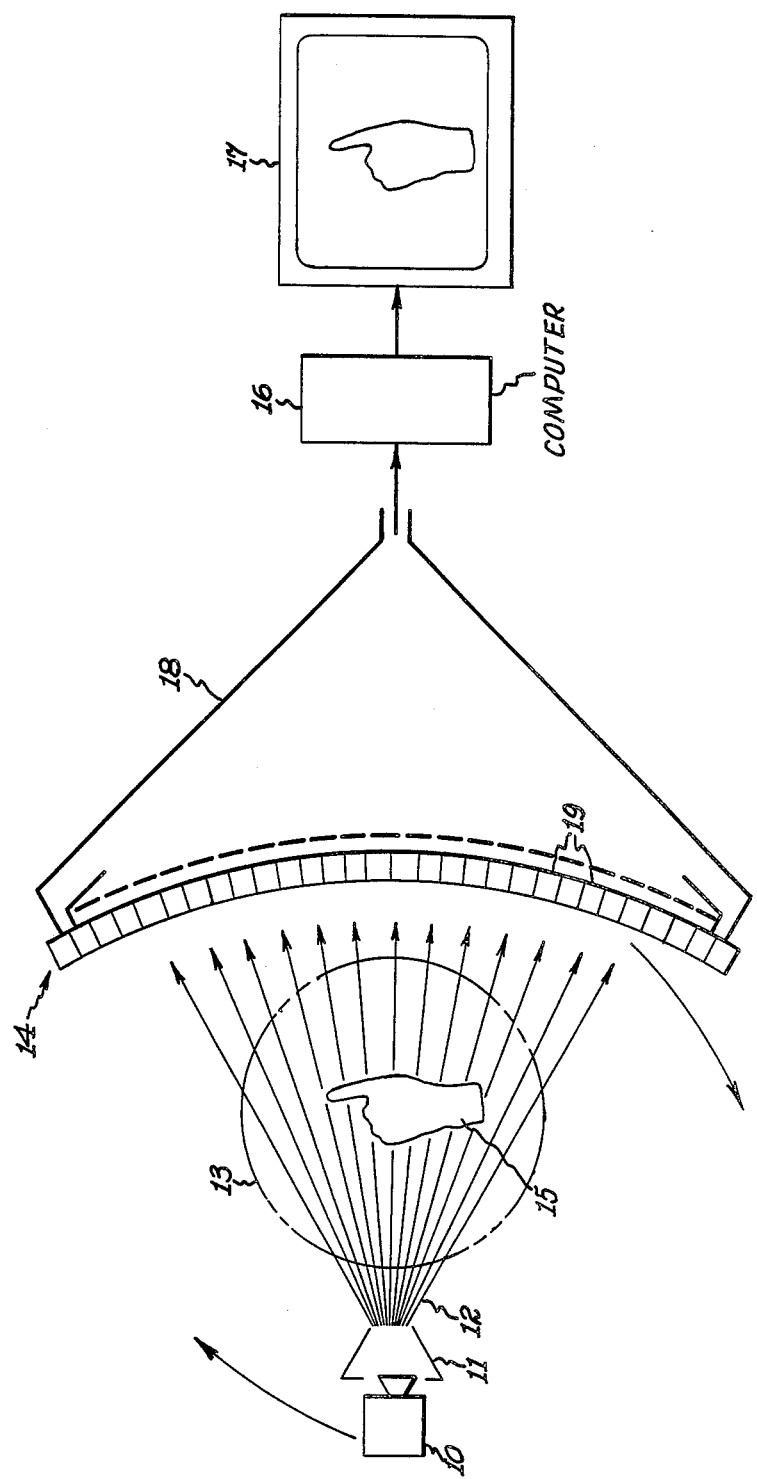

SOLID STATE SCINTILLATOR AND TREATMENT THEREFOR

RELATED PATENT APPLICATION

A co-pending application Ser. No. 814,804, filed Dec. 30, 1985, assigned to the same assignee as the present application, discloses a densely sintered polycrystalline gadolinia containing ceramic scintillator with a similar composition to that being modified in accordance with the present invention. Since the present invention represents an improvement thereof, said referenced co-pending application is specifically incorporated herein by reference.

BACKGROUND OF THE INVENTION

This invention relates generally to improved rare-earth doped ceramic scintillator materials which are especially useful in medical radiographic applications as well as other x-ray, gamma radiation, and nuclear radiation detection applications. More specifically, the present invention relates to rare earth doped polycrystalline yttria-gadolinia ($Y_2O_3$—$Gd_2O_3$) ceramic scintillators which have been treated during or after sintering to reduce radiation damage otherwise occurring when said scintillator material is exposed to the aforementioned type high energy radiation for the conversion of said radiation to a display image.

Solid state scintillator materials have long been used as radiation detectors to detect penetrating radiation in such applications as x-ray counters and image intensifiers. More recently, such detectors have played an important role in computerized tomography (CT) scanners, digital radiography (DR), and other x-ray, gamma radiation, ultraviolet radiation, and nuclear radiation detecting applications. The scintillator materials emit visible or near visible radiation when stimulated by x-rays or other high energy electromagnetic photons hence are widely incorporated as integral parts of various industrial and medical radiographic equipment. In medical applications, it is especially desirable that the scintillator output be as large as possible to minimize exposure of the medical patient to the x-ray dosage. A known class of scintillator materials considered for use in CT applications is monocrystalline inorganic compounds such as cesium iodide (CsI), bismuth germanate ($Bi_4Ge_3O_2$), cadmium tunstate ($CdWO_4$), calcium tunstate ($CaWO_4$) and sodium iodide (NaI). Another known class of solid state scintillator materials comprises polycrystalline inorganic phosphors including europium activated barium fluorochloride (BaFCl:Eu), terbium activated lanthanum oxybromide (LaOBR:Tb) and thulium activated lanthanum oxybromide (LaOBr:Tm). A still third class of already known solid state scintillator materials found useful in computerized tomography comprises various dense sintered polycrystalline ceramics such as rare earth doped yttria-gadolinia ($Y_2O_3/Gd_2O_3$) and polycrystalline forms of said previously mentioned phosphors including BaFCl:Eu, LaOBr:Tb, CsI:Tl, $CaWO_4$, and $CdWO_4$.

In the aforementioned commonly assigned copending application, there is disclosed a CT scanner employing a solid state scintillator body as the x-ray conversion means. Said prior art polycrystalline ceramic scintillator comprises between about 5 and 50 mole percent $Gd_2O_3$, between about 0.02 and 12 mole percent of either $Eu_2O_3$ or $Nd_2O_3$ as a rare earth activator oxide, between about 0.003 and 0.5 mole percent of at least one afterglow reducer selected from the group consisting of $Pr_2O_3$ and $Tb_2O_3$, the remainder of said scintillator composition being $Y_2O_3$. As recognized in connection with the CT scanner equipment further disclosed in said co-pending application, the scintillator material when excited by impinging X radiation emits optical wavelengths energy. In typical medical or industrial applications, the optical output from the scintillator material is made to impinge upon a photoelectrically responsive device which produces electrical output signals. The amplitude of these signals is directly related to the intensity of the impinging X radiation. The electrical signals can be digitzed for processing by digital computer means, which means generates the absorption co-efficients in a form suitable for a display on a cathode ray tube screen or other permanent media.

In order to meet the specific and demanding requirements of this type medical radiographic applications, the scintillator material employed must be an efficient converter of X radiation into optical radiation, in those regions of the electromagnetic spectrum which are most efficiently detected by photodetection means such as photomultipliers or photodiodes. It is also desirable that this scintillator materials transmit optical radiation efficiently, by avoiding optical trapping, so that optical radiation originating deep inside the scintillator body escapes for detection by the externally situated photodetectors. The scintillator materials should also have high x-ray stopping power, low hysteresis, spectral linearity, and short afterglow or persistance. High x-ray stopping power is desirable for efficient x-ray detection, because x-rays not absorbed by the scintillator escape detection. Hysteresis refers to the scintillator material property whereby the optical output varies for identical x-ray exitation, based on the irradiation history of the scintillator. For CT applications, typical detection accuracies are on the order of one part in one thousand, for a number of successive measurements taken at a relatively high rate. Accordingly, low hysteresis is required in order to provide repeated precise measurements of optical output from each scintillator body, and to provide substantially identical optical outputs for identical X radiation exposure impinging upon the scintillator body. Spectral linearity is important because x-rays impinging upon the scintillator body typically include a number of different frequencies, and because the scintillator response to the radiation should be substantially uniform for all such frequencies. Afterglow or persistance is the tendancy of the scintillator to continue emitting optical radiation for a time after termination of the x-ray exitation. Long afterglow results in blurring, with time, of the information bearing signal.

Polycrystalline ceramic scintillators exhibiting many of the desirable properties mentioned above are further described in U.S. Pat. No. 4,421,671, also assigned to the present assignee. The scintillator described therein are comprised of yttria and gadolinia, and include at least one of a variety of rare earth activators for enhancing luminescent efficiency. The scintillator composition may also include one or more of several disclosed transparancy promoter and light output restorers. Said aforementioned patent still further discloses that luminescent afterglow of the yttria-gadolinia ceramic scintillators described therein may be reduced by adding ytterbium oxide ($Yb_2O_3$), strontium oxide (SrO), or calcium oxide (CaO).

Radiographic equipment employing said prior art solid state scintillator materials for the conversion of high energy radiation to an optical image still experience efficiency loss after exposure to high dosages of radiation. For example, radiation damage resulting for bismuth germanate single crystal scintillators reports an 11% damage occurring after a thirty minute exposure to ultraviolet radiation from a mercury lamp. A similar result occurs for higher energy gamma radiation. Furthermore, the variation in radiation damage from crystal to crystal of bismuth germanate is reported to be quite high, approximately a factor of 30. A similar efficiency loss is found when the above mentioned polycrystalline type ceramic scintillators are exposed to high energy radiation dosages. The radiation damage in said type scintillator materials is characterized by loss in light output and/or a darkening in color with prolonged exposure to radiation, and this decreased light output is found to be variable in magnitude from batch-to-batch. For example, yttria-gadolinia ceramic scintillators activated with europium exhibit a reduction in light output of 4 to 33%, depending upon the batch, for 450 roentgens of 140 kVP x-rays. This amount and variation of x-ray damage is undesirable in a quantitative x-ray detector and must be minimized in order to avoid ghost images from prior scans.

It remains desirable, therefore, to provide a polycrystalline solid state scintillator material which is not subject to damage produced from exposure to high radiation dosages.

It is another important object of the present invention to modify already known efficient polycrystalline solid state scintillator materials so as to better resist changes in scintillator efficiency with increasing x-ray dosage.

It is still another important object of the present invention to provide a method for preparing such improved polycrystalline type solid state scintillator materials.

Still another important object of the present invention is to provide improved radiographic equipment and methods utilizing said presently modified polycrystalline type solid state scintillator materials.

SUMMARY OF THE INVENTION

Briefly, a particular anneal treatment given to rare earth doped gadolinia type ceramic scintillator body provides increased resistance to radiation damage and can be carried out in a simple as well as direct manner. Since the sintering operation to form this ceramic material is ordinarily achieved by heating a pressed compact of the high purity (99.99% or greater) metal oxide ingredients in a refractory metal (tungsten) furnace using a wet hydrogen gas atmosphere (dewpoint=20° C.) at temperatures in the range 1700°–2000° C., said anneal can be achieved while the sintered material is otherwise cooling to ambient conditions. Such an annealing modification simply requires that the sintered material be cooled in the temperature range about 1500°–1000° C. for several hours in a controlled oxygen containing atmosphere at partial oxygen pressures between about $10^{-2}$ up to about $10^{-4}$ atmosphere. Alternately, a suitable anneal can be achieved by reheating the already sintered ceramic to the aforementioned upper annealing temperature and thereafter cooling said ceramic while maintaining the specified controlled oxygen containing atmosphere at a typical cooling rate of approximately 300° C. per hour. A suitable atmosphere for either type annealing step can be provided with an inert gas, such as argon, which includes the aforementioned oxygen partial pressures although pure oxygen and air maintained at subatmospheric conditions which produce said oxygen partial pressures are also contemplated. For example, an air atmosphere maintained in the range from about $5 \times 10^{-7}$ atmosphere up to about $1.5 \times 10^{-1}$ atmosphere is expected to prove suitable for a proper anneal of the present type scintillator materials.

The general class of densely sintered rare earth doped gadolinia containing ceramic scintillator materials which can be improved in the foregoing manner is more fully disclosed in U.S. Pat. No. 4,421,671 along with several suitable preparation methods achieving the desired cubic crystalline form in the final sintered material. To achieve said objective generally requires that a compact of the metal oxide precursor material be hot pressed since cold pressing and sintering of said materials tends to form an undesirable monoclinic crystalline structure in the final material. Accordingly, the desired final produce can be achieved by methods of preparation disclosed in the referenced patent such as vacuum hot pressing and sintering combined with gas hot isostatic pressing. Scintillators described in said referenced patent are comprised of yttria and gadolinia, and at least one of a variety of rare earth activators for enhancing luminescent efficiency. The scintillator composition may optionally include one or more of several disclosed transparency promoters and light output restorers. The referenced patent further discloses that luminescent afterglow of the yttria-gadolinia ceramic scintillators described therein may be reduced by adding ytterbium oxide ($Yb_2O_3$), strontium oxide (SrO), or calcium oxide (CaO). A still more limited class of these yttria-gadolinia scintillators which can be particularly benefited according to the present invention is disclosed in the above mentioned copending application Ser. No. 814,804. The latter ceramics include between about 5 and 50 mole percent $Gd_2O_3$, between about 0.02 and 12 mole percent of either $Eu_2O_3$ or $Nd_2O_3$ as a rare earth activator oxide, and between about 0.003 and 0.5 mole percent of at least one afterglow reducer from the group consisting of $Pr_2O_3$ and $Tb_2O_3$, the remainder of said scintillator composition being $Y_2O_3$. Although it is further recognized in said copending application that the heating of the ceramic in an oxygen containing atmosphere for one - twenty hours at a temperature between about 800°–1200° C. improved its optical transparency, such does not recognize that the presently disclosed oxygen anneal can produce any added resistance to radiation damage. It has also now been discovered that only a still more limited class of said rare earth doped yttria-gadolinia scintillator achieves the full benefit when modified according to the present invention. Said more limited ceramic composition comprises from about 5 mole percent up to about 50 mole percent $Gd_2O_3$, between about 0.5 and 12 mole percent of a rare earth activator oxide selected from the group consisting of $Eu_2O_3$ and $Nd_2O_3$, and between about 0.0001 and 0.5 mole percent of at least one afterglow reducer selected from the group consisting of $Pr_2O_3$ and $Tb_2O_3$, the remainder of said composition being $Y_2O_3$. As previously recognized, however, said presently improved scintillator material may still further contain other metal ions selected from zirconium, hafnium, thorium, and tantalum to serve as transparency promoting densifying agents while also containing at least one light output restorer selected from CaO and SrO in an amount sufficient to effect a higher light output than said ceramic absent said restorer.

Various types of modern CT scanners to be more fully described hereinafter can be improved by employment of the presently improved ceramic scintillators. A typical radiographic imaging system of this type utilizes an x-ray source, a scintillator body to convert the x-rays to an optical image, and photodetection means coupled thereto for converting said optical image to an electronic display thereof. Said radiographic imaging system further generally includes means for digital recording of said optical image which can still further include digital processing means to enhance the quality of the finally displayed image in an already known manner.

BRIEF DESCRIPTION OF THE ACCOMPANYING DRAWING

The drawing is a schematic representation partially in block diagram form for a typical CT scanner system for production, transmission, and detection of X radiation utilizing the presently modified scintillator materials.

DETAILED DESCRIPTION OF THE PREFERRED EMBODIMENTS

Referring to accompanying drawing, there is depicted partially in block diagram form a typical CT scanner for the production, transmission, and detection of X radiation. This scanner includes radiation source 10, for producing penetrating radiation. Radiation source 10 frequently comprises a rotating anode x-ray tube. The radiation produced by source 10 is columated by columator 11 to produce a thin beam of x-rays 12 which is projected through aperture 13 toward x-ray detector 14. A subject or body to be examined, such as subject 15, is positioned in the path of the fan beam of x-rays 12 in such a manner that the beam is attenuated as it passes through subject 15, with the amount of attenuation being dependent upon the density of subject 15. Radiation detector 14 comprises detector array housing 18 having a plurality of channels 19 defined therein. Channels 19 are configured so as to receive the attenuated fan beam of x-rays 12 and so to produce electrical signals which are dependent on the intensity of the radiation received within each channel. The resulting electrical signals are therefore a measure of the attenuation of the x-ray beam by the portion of the body through which the beam has passed. In said x-ray radiation detector, channels 19 typically comprise a plurality of columated cells with each cell being of the type already known as further described in the aforementioned co-pending patent application and which comprises the presently modified scintillator body.

In operation, electrical signal readings are taken from each channel 19 at a plurality of angular positions with respect to subject 15, while source 10 and detector 14 are rotated about said subject. The resulting readings are digitized and transmitted to computer means 16, which uses one of a number of available algorithms to compute and construct a picture of the cross section transversed by the fan beam of x-rays 12. The resulting picture is displayed on cathode ray tube 17, or, alternately, may be used to create an image on permanent media such as photographic film or the like.

To still further illustrate a typical treatment method providing increased resistance to radiation damage for the previously disclosed ceramic scintillator materials, there is reported in Table I below various radiation damage measurements conducted upon treated scintillator materials of this type. More particularly, sample of a $(Y_{.67}Gd_{.30}Eu_{.03}Pr_{.00015})_2O_3$ ceramic that had been prepared in the above described manner were thereafter annealed in a closed alumina tube inserted in a molybdenum disilicide resistance furnace at the various elevated temperatures reported in Table I while further being subjected to various controlled oxygen containing atmospheres also reported in said Table. Cooling rates maintained during said annealing treatments were approximately 300° C. per hour with an annealing period of ten hours being maintained while the samples were held in a temperature range between 1000° and 1500° C. Additionally, various samples were annealed in air and pure oxygen as further reported in Table I at the specified oxygen partial pressures.

TABLE I

| Oxygen Partial Pressure (Atm) | Anneal Temperature (°C.) | X-ray Damage After Exposure to | |
|---|---|---|---|
| | | 450 R | 2000 R |
| $10^{-9}$ (as sintered) | 1950 | 3.5 to 6% | 6 to 10% |
| $1 \times 10^{-4}$ | 1500 | 2.2 to 3% | 5.0 to 6.5% |
| $2.5 \times 10^{-3}$ | 1500 | 1.5 | |
| $1.3 \times 10^{-2}$ | 1500 | 1.8 | |
| $2 \times 10^{-1}$ | 1500 | | 46% |
| 1 (pure $O_2$) | 1420 | | 30% |
| $1.3 (10)^{-4}$ | 1420 | 2.4–3.2% | |
| $2.5 (10)^{-3}$ | 1400 | 1.8–2.1% | |
| $1.3 (10)^{-2}$ | 1400 | 1.6–1.6% | |

Results in Table I clearly demonstate that the radiation damage resistance of an as-sintered ceramic scintillator was markedly improved by annealing in higher partial pressures of oxygen up to values of about $10^{-2}$ atmospheres at a temperature of 1400° C. It can be pointed out in this regard that a value of radiation damage which is one-half of another treated sample signifies that the life of the former sample is about twice as long and thereby represents a considerable improvement. In addition, the spread in damage values was smaller for the annealed material. Said results also demonstate, however, that exceedingly poor radiation resistance was found in samples annealed in higher oxygen pressures of $2 \times 10^{-1}$ (air) and one atmosphere (pure oxygen).

Still further radiation damage measurements were conducted with the above defined ceramic scintillator material to determine the effect of annealing temperature alone on radiation damage and as reported in Table II below. Specifically, the oxygen partial pressures employed for said annealing treatments is reported in Table II along with the amounts of x-ray damage experienced after the further therein reported x-ray dosages.

TABLE II

| Oxygen Partial Pressure (Atm) | Anneal Temperature (°C.) | X-ray Damage After Exposure to | |
|---|---|---|---|
| | | 450 R | 2000 R |
| $1.3 \times 10^{-2}$ to $1 \times 10^{-4}$ | 1500 | 1.5 to 3.0% | 4 to 6% |
| " | 1400 | 1.5 to 3.0% | 4% |
| " | 1300 | | 6% |

For improved radiation resistance the result of Table II demonstate that temperatures for the post-sintering annealing treatment can range between about 1300° and 1500° C. for a ten hour annealing period at oxygen partial pressures between $10^{-4}$ and $10^{-2}$ atmosphere. While annealing periods less than ten hours can be employed without suffering a significant loss of the present improvement, further indications exist that benefit is optimal at anneal periods of at least three hours for the particular controlled oxidation conditions reported in the tests conducted.

It will be apparent from the foregoing description that a broadly useful method has been discovered to improve the radiation resistance of ceramic type scintillator materials so as to enable enhanced quality for the optical image being formed and recorded. It will be apparent from the foregoing description, however, that various modifications in the specific embodiments above described can be made without departing from the spirit and scope of the present invention. For example, it is contemplated that still other rare earth doped gadolinia containing ceramics than above specifically evaluated can be benefited in the same manner albeit possibly not to the same degree as the specifically reported embodiment. Additionally, still other physical configurations of the above specifically disclosed CT scanner equipment can employ the presently improved scintillator materials. It is intended to limit the present invention, therefore, only to the scope of the following claims.

What we claim as new and desire to secure by Letters Patent of the United States is:

1. A polycrystalline X-ray stimulable scintillator body comprising a sintered rare earth doped gadolinia and yttria ceramic having a cubic crystal structure which has received a controlled oxidation anneal to reduce radiation damage otherwise occurring when said scintillating body is exposed to X-ray radiation during conversion of said X-ray radiation to a display image, the composition of said ceramic comprising from about 5 mole percent to about 50 mole percent $Gd_2O_3$, between about 0.5 and 12 mole percent of a rare earth activator oxide selected from the group consisting of $Eu_2O_3$ and $Nd_2O_3$, and between about 0.0001 and 0.5 mole percent of at least one afterglow reducer selected from the group of $Pr_2O_3$ and $Tb_2O_3$, the remainder of said composition being $Y_2O_3$, said controlled oxidation anneal being effected from about 1000° C. up to about 1500° C. at an oxygen partial pressure in the range from about $10^{-4}$ up to about $10^{-2}$ atmosphere, said scintillator body exhibiting a smaller efficiency loss when exposed to X-ray radiation than said body absent said controlled oxidation anneal.

2. A scintillator body as in claim 1 wherein said controlled anneal is conducted in air at subatmospheric pressures.

3. A scintillator body as in claim 2 wherein the subatmospheric air pressure is maintained in the range from about $5 \times 10^{-7}$ atmosphere up to about $1.5 \times 10^{-1}$ atmosphere.

4. A scintillator body as in claim 1 wherein the rare earth activator oxide is $Eu_2O_3$.

5. A scintillator body as in claim 1 wherein the ceramic contains other metal ions selected from zirconium, hafnium, thorium, and tantalum to serve as transparency promoting densifying agents.

6. A scintillator body as in claim 5 wherein the ceramic still further contains at least one light output receiver selected from CaO and SrO in an amount sufficient to effect a higher light output than said ceramic absent said restorers.

7. A method for preparing a polycrystalline x-ray stimulable scintillator body which is more resistent to radiation damage comprising the steps of:

(a) sintering a rare earth doped gadolina containing a metal oxide compact to form a dense ceramic body having a cubic crystal structure, the composition of said ceramic body comprising from about 5 mole percent up to about 50 mole percent $Gd_2O_3$, between about 0.5 and 12 mole percent of a rare earth activator oxide selected from the group consisting of $Eu_2O_3$ and $Nd_2O_3$, and between about 0.0001 and 0.5 mole percent of at least one afterglow reducer selected from the group consisting of $Pr_2O_3$ and $Tb_2O_3$, the remainder of said composition being $Y_2O_3$, and (b) annealing said ceramic body in a controlled oxygen containing atmosphere, said controlled oxidation anneal being effected from about 1000° C. up to about 1500° C. at an oxygen partial pressure in the range from about $10^{-4}$ up to about $10^{-2}$ atmosphere, said ceramic body exhibiting a smaller efficiency loss when exposed to X-ray radiation than said body absent said controlled oxidation anneal.

8. A method as in claim 7 wherein said controlled anneal is conducted in air at subatmospheric pressure.

9. A method as in claim 8 wherein said subatmospheric air pressure is maintained in the range from about $5 \times 10^{-7}$ atmosphere up to about $1.5 \times 10^{-1}$ atmosphere.

10. A method as in claim 7 wherein the sintering action is achieved by hot pressing.

11. A method as in claim 7 wherein the rare earth activator oxide is europium oxide ($Eu_2O_3$).

12. A method as in claim 7 wherein said metal oxide compact still further contains other metal ions selected from zirconium, hafnium, thorium and tantalum to serve as transparency promoting densifying agents.

13. A method as in claim 12 wherein said metal oxide compact still further contains at least one light output restorer selected from CaO and SrO in an amount sufficient to effect a higher light output than said scintillator body absent said restorer.

14. In a radiographic imaging system utilizing an X-ray source, a scintillator body to convert the X-rays to an optical image, and photodetection means coupled thereto for converting said optical image to an electronic display thereof, the improvement wherein said scintillator body comprises a polycrystalline sintered rare earth doped gadolinia containing ceramic having a cubic crystal structure which has received a controlled oxidation anneal to reduce radiation damage otherwise occurring when said scintillator body is exposed to said X-rays, the composition of said ceramic comprising from about 5 mole percent up to about 50 mole percent $Gd_2O_3$, between about 0.5 and 12 mole percent of a rare earth activator oxide selected from the group consisting of $Eu_2O_3$ and $Nd_2O_3$, and between about 0.0001 and 0.5 mole percent of at least one afterglow reducer selected from the group consisting of $Pr_2O_3$ and $Tb_2O_3$, the remainder of said composition being $Y_2O_3$, said controlled oxidation anneal being effected from about 1000° C. up to about 1500° C. at an oxygen partial pressure in the range from about $10^{-4}$ up to about $10^{-2}$ atmosphere, said scintillator body exhibiting a smaller efficiency loss when exposed to X-ray radiation than said body absent said controlled oxidation anneal.

15. A radiographic imaging system as in claim 14 wherein the rare earth activator oxide is $Eu_2O_3$.

16. A radiographic imaging system as in claim 14 wherein the ceramic further contains other metal ions selected from zirconium, thorium and tantalum to serve as transparency promoting densifying agents.

17. A radiographic imaging system as in claim 16 wherein the ceramic still further contains at least one light output restorer selected from CaO and SrO in an amount sufficient to effect a higher light output than said ceramic absent said restorers

* * * * *

UNITED STATES PATENT AND TRADEMARK OFFICE
CERTIFICATE OF CORRECTION

PATENT NO. : 4,783,596
DATED : November 8, 1988
INVENTOR(S) : Robert Joseph Riedner et al It is certified that error appears in the above-identified patent and that said Letters Patent are hereby corrected as shown below:

In column 1, changes should be made as follows:
    line 47, replace "tunstate" with ---tungstate---.
    lines 47-48, replace "tunstate" with ---tungstate---.

In column 2:
    line 13, replace "digitzed" with ---digitized---.
    line 18, replace "this" with ---these---.
    line 24, replace "materials" with ---material---.
    line 36, replace "exitation" with ---excitation---.
    line 53, replace "exitation" with ---excitation---.
    line 58, insert ---materials--- between "scintillator" and "described".
    line 61, replace "composition" with ---compositions---.
    line 63, replace "promoter" with ---promoters---.

In column 3:
    line 45, insert ---a--- between "to" and "rare",

In column 4:
    line 16, replace "material" with ---materials---.
    line 20, replace "produce" with ---product---.

In column 5:
    line 25, insert ---the--- between "to" and "accompanying".
    line 31, replace "columated" with ---collimated---.
    line 32, replace "columator" with ---collimator---.
    line 49, replace "columated" with ---collimated---.
    line 60, replace "transversed" with ---traversed---.

In column 6:
    line 62, replace "result" with ---results---.

Claim 1, line 1, replace "stimulable" with ---stimuable---.
        line 6, replace "scintillating" with ---scintillator---

Claim 6, line 3, replace "receiver" with ---restorer"---.

UNITED STATES PATENT AND TRADEMARK OFFICE
CERTIFICATE OF CORRECTION

PATENT NO. : 4,783,596

DATED : November 8, 1988

INVENTOR(S) : Robert Joseph Riedner et al.

It is certified that error appears in the above-identified patent and that said Letters Patent is hereby corrected as shown below:

Column 6, Claim 7, line 4, cancel -- a -- after "containing"

Signed and Sealed this

Twenty-fifth Day of April, 1989

Attest:

DONALD J. QUIGG

*Attesting Officer*      *Commissioner of Patents and Trademarks*